United States Patent [19]

Chen et al.

[11] Patent Number: 5,628,813

[45] Date of Patent: May 13, 1997

[54] ABRASION RESISTANT TOPCOATS FOR CONTROL RELEASE COATINGS

[75] Inventors: Frank Shi-Chow Chen, Edmonton; Albert J. Geiger, Fort Saskatchewan, both of Canada

[73] Assignee: Exxon Chemical Patents Inc., Wilmington, Del.

[21] Appl. No.: 993,686

[22] Filed: Dec. 21, 1992

[51] Int. Cl.$^6$ ............................................ C05G 3/00
[52] U.S. Cl. .................... 71/64.02; 71/64.07; 71/64.11; 71/64.13
[58] Field of Search .................... 71/64.02, 64.07, 71/64.11, 64.13

[56] References Cited

U.S. PATENT DOCUMENTS

| | | | |
|---|---|---|---|
| 3,353,949 | 11/1967 | Nau | 71/64 |
| 3,558,299 | 1/1971 | Baskin | 71/28 |
| 3,580,715 | 5/1971 | Dilday | 71/28 |
| 3,697,245 | 10/1972 | Dilday | 71/28 |
| 3,744,987 | 7/1973 | Omura et al. | 71/64.07 |
| 4,676,821 | 6/1987 | Gullett et al. | 71/28 |
| 4,701,204 | 10/1987 | Daudevani et al. | 71/64.07 |
| 4,846,871 | 7/1989 | Detroit | 71/25 |
| 5,032,164 | 7/1991 | Sanford et al. | 71/28 |
| 5,238,480 | 8/1993 | Rehberg et al. | 71/64.07 |

FOREIGN PATENT DOCUMENTS

| | | | |
|---|---|---|---|
| 2111686 | 4/1990 | Japan | 71/64.07 |

*Primary Examiner*—Ferris Lander

[57] ABSTRACT

The present invention provides for controlled release chemical compositions having improved controlled release properties wherein core substrate particles comprising a water soluble chemical compound, such as a fertilizer or oil well chemical, which are surrounded and encapsulated by a controlled release coating which is slowly permeable to water, such as a thin layer of polymeric material, are further overcoated with one or more coating layers comprising a finely divided filler preferably talc, dispersed in a metal or ammonium lignosulfonate binder. The outer coating serves to protect the underlying, thin film, controlled release coating from abrasion and impact damage occasioned by packaging, blending and dispensing equipment, thereby preserving the water permeating properties designed into such coating. The outer protective coating is itself permeable to water, allowing the layer beneath it to control the rate of water contact with the substrate core and subsequent release of the core substance into its environment.

5 Claims, No Drawings

ABRASION RESISTANT TOPCOATS FOR CONTROL RELEASE COATINGS

BACKGROUND OF THE INVENTION

1. Field of the Invention

The present invention relates to abrasion resistant topcoatings applied to the surface of liquid permeable control release coatings which in turn encapsulate water soluble substrates to provide controlled or delayed release of the substrate when contacted with water.

2. Description of Related Art

The application of coating materials to the surface of various granular chemical substrates is a well known technique for controlling or delaying the release of that substrate when placed in an environment in which the substrate would otherwise quickly dissolve. Encapsulation of a substrate such as a pharmaceutical, a fertilizer or reagent used in subterranean oil recovery operations using an encapsulant which is slowly permeable to water insulates the substrate from immediate contact with an aqueous environment into which it is introduced, e.g., wet soil as in the case of fertilizer or aqueous fracturing fluids used in fossil oil recovery operations. Over a period of time in contact with the aqueous environment, the substrate is caused to be gradually released into the environment as a consequence of the gradual permeation of water through the encapsulant and into the substrate and gradual leaching away of the dissolved substrate into the environment as a consequence of the build up of osmotic pressure or rupture of the protective coating.

Specific applications of this technology include the use of controlled release oxidizers or breaker chemicals in combination with high viscosity fracturing fluids which are pumped into well bores to improve the efficiency of well drilling operations. A high viscosity, aqueous based fracturing fluid is pumped into the well bore at a rate and pressure sufficient to produce one or more subterranean fractures or extend or enlarge existing fractures. Included in the fracturing fluid is an oxidizer chemical, such as ammonium persulfate, encapsulated in a polymeric coating which is slowly permeable to water. As water permeates the coating and begins to dissolve the substrate, a corresponding build up in osmotic pressure leads to reverse osmosis or a rupture of the coating shell and subsequent release of the oxidizer. Subterranean release of the oxidizer initiates a breakdown in the viscosity of the surrounding fracturing fluid which facilitates removal of the fluid and recovery of residual oil from the enlarged fractures. Such systems are disclosed in U.S. Pat. Nos. 4,741,401 and 4,770,796.

Another application of controlled release technology is the use of water permeable coatings for fertilizer and/or plant nutrient substrates. Rapid release of water soluble plant food in soils containing the plants can cause phytotoxicity to the plants and rapid depletion of the plant food by leaching. This problem is dealt with by encapsulating the fertilizer or nutrient substrate with a thin layer of a material which is slowly permeable to water such that the rate at which the fertilizer is leached into the soil is diminished, and ideally approximates the rate of plant uptake of these nutrients.

Control release coatings which have been used with fertilizer substrates include molten sulfur, paraffin waxes, various polymer coatings such as vinyl or vinylidene chloride copolymers such as disclosed in U.S. Pat. No. 4,711,059, polyurethanes as disclosed in U.S. Pat. Nos. 3,264,089, 4,711,659, and 4,772,490, phenol formaldehyde resins, as disclosed in U.S. Pat. No. 3,744,987, elastomeric polymers such as neutralized, sulfonated ethylene-propylene-diene (EPDM) terpolymers disclosed in U.S. Pat No. 4,988,377 and ionomer polymers such as disclosed in U.S. Pat. No. 4,970,117.

One of the major problems associated with many controlled release coatings such as those generally described above is damage to the thin, fragile coating as a consequence of product handling operations which include blending, packaging, transport and application in the field using mechanical equipment. When damage occurs to a controlled release coating, the product loses its controlled release properties completely or in part, since coating holes, cracks or thin spots allow for rapid access of water in which the substrate material is soluble.

SUMMARY OF THE INVENTION

The present invention provides for controlled release chemical compositions having improved controlled release properties wherein core substrate particles comprising a water soluble chemical compound, such as a fertilizer or oil well chemical, each of which are surrounded and encapsulated by a controlled release coating which is slowly permeable to water, such as a thin layer of polymeric material, are further overcoated with one or more coating layers comprising a finely divided filler, preferably a mineral filler, dispersed in a metal or ammonium lignosulfonate binder. The outer coating serves to protect the underlying, thin film, controlled release coating from abrasion and impact damage occasioned by packaging, blending and dispensing equipment, thereby preserving the water permeating properties designed into such coating. The outer protective coating is itself readily permeable to water, allowing the layer beneath it to control the rate of water contact with the substrate core and subsequent release of the core substance into its environment.

The invention also provides for a method for preparing the improved controlled release compositions wherein core particles of the water soluble compound, which are encapsulated by the control release coating, are mixed with an aqueous solution containing the lignosulfonate to uniformly coat the particles with solution, followed by contact of the coated particles with the finely divided filler such that the filler uniformly adheres to the surface of the coated particles. Sequential coating using the aqueous solution and filler followed by drying provides a multilayer protective coating comprising the filler dispersed in the lignosulfonate binder.

DETAILED DESCRIPTION OF THE INVENTION

Lignosulfonates have heretofore been used in combination with fertilizer materials as hardening agents or to impart anti-caking or anti-dusting properties. For example, U.S. Pat. Nos. 4,846,871 and 5,041,153 disclose a process for improving the hardness, anti-caking and anti-dusting properties of an inorganic fertilizer comprising a homogeneous admixture of the fertilizer and up to about 5.0 wt. % of a lignosulfonate. The lignosulfonate is preferably incorporated into the fertilizer by admixing it with recycle fines and spraying this mixture on the fertilizer substrate in a granulator where the applied material aids in build up the size of the granules formed.

Similar results are achieved in accordance with U.S. Pat. No. 5,032,164 wherein homogeneous mixtures of lignosulfonates and urea fertilizer are prepared.

U.S. Pat. No. 4,676,821 discloses the preparation of a controlled release urea fertilizer by forming a mixture of molten urea and a lignosulfonate, converting the mixture into particulate form and then applying a sulfur overcoat.

In addition, lignosulfonates or mineral fillers have been used to overcoat fertilizer substrates. For example, U.S. Pat. No. 3,353,949 teaches a method of adhering finely divided supplemental nutrients to the surface of primary fertilizer granules using a binder or conditioner which may be a metal lignin sulfonate.

U.S. Pat. No. 3,558,299 discloses a technique for reducing the caking tendency of urea fertilizer granules comprising overcoating the urea particles with a mixture of a finely divided clay, such as talc, and a urease-containing material.

U.S. Pat. Nos. 3,580,715 and 3,697,245 disclose a process for forming a tightly adherent coating of fertilizer supplement on urea granules comprising coating the granules with mineral oil, further overcoating with an aqueous calcium lignosulfonate solution and then adding a finely divided fertilizer supplement such as sulfur.

However, none of the above referenced patents address the problem of both protecting from damage a thin controlled release coating applied to fertilizer and other substrates while preserving the controlled release properties of the coating. The overcoat of the present invention serves as a sacrificial barrier to protect the underlying thin release coating membrane from abrasion and impact and is of high water permeability permitting the water permeability properties of the release coating to control release of the core water soluble substrate.

A variety of substrates which are discrete, particulate solids and which are further overcoated with a controlled release coating are applicable in the present invention. Examples include fertilizers, bioremedials, plant micronutrients, synthetic reagents and catalysts such as oil well chemicals, and like substrates. These substrate particles generally have an average particle size in the range of from about 0.1 to about 5 millimeters (mm), more preferably from about 0.5 to about 3 mm.

Fertilizer substrates in accordance with this invention include ammonium nitrate, urea, potassium chloride, ammonium phosphate, potash, like water soluble materials and mixtures thereof, alone or further admixed with known water soluble plant nutrients and/or plant supplements. These substrates may be provided in the form of heterogeneous granules (prills) sized to pass 6 mesh and to be substantially retained on 14 mesh U.S. standard screens. Oil well chemical substrates in accordance with this invention include scale inhibitors such as phosphates, phosphate esters and inorganic phosphates; corrosion inhibitors such as amines and polyamines; biocides such as aldehydes or halopropionamides; oxygen scavengers such as sodium bisulfite; and other oil well regents such as disclosed in U.S. Pat. No. 4,670,166, the disclosure of which is incorporated herein by reference. Another category of oil well chemicals are the so-called breaker reagents which are introduced with fracturing fluids into subterranean formations to lower the viscosity of the fracturing fluid. Examples of such breaker chemicals are sodium and ammonium persulfate, alpha and beta amylases and glucosidases and similar reagents such as disclosed in U.S. Pat. No. 4,506,734, the disclosure of which is incorporated herein by reference. These oil well chemicals normally have a particle size in the range of from about 0.4 to about 1.7 mm.

Controlled release coatings which may be applied to the surface of the particle substrate to encapsulate same include those well known materials described above such as sulfur, waxes, and polymeric material such as polyethylene, polypropylene, ethylene/propylene copolymers, polystyrene, copolymers of styrene with acrylic or methacrylic monomers, ethylene-vinyl acetate copolymers, polyvinyl or polyvinylidene homopolymers and copolymers, polyurethanes, phenol or urea-formaldehyde condensation polymers, polyethers and ionomers such as the neutralized ethylene-carboxylated copolymers disclosed in U.S. Pat. No. 4,970,117 or the neutralized sulfonated ethylene-propylene-non conjugated diene terpolymers disclosed in U.S. Pat. No. 4,988,377, the complete disclosure of each of which patents is incorporated herein by reference. Preferred coating materials are those which are inert (non-reactive) with the particular substrate under storage conditions.

The controlled release coating can be applied to the surface of the particulate substrate by any known technique which will assure uniform coverage and encapsulation of the substrate surface, such as by spraying the coating material in the form of a solution, emulsion, or finely divided powder onto a tumbling, mobile mass of the substrate in a rotary drum or pan mixer, or by fluidized bed coating techniques such as disclosed in U.S. Pat. No. 4,988,377. In general, the controlled release coating is applied at a thickness designed to provide the desired control release properties, depending on the identity of the substrate and rate of water permeation of the controlled release coating material employed. For materials having a water vapor transmission rate in the range of from about 0.01 to 20, expressed as a water transmission rate in grams for a film of 1 mil thickness per square inch per 24 hours at 38° C., coating thicknesses in the range of from about 1 to about 100 microns are suitable. The preferred controlled release coating thickness for polymeric materials is in the range of from about 1 to about 50 microns, more preferably from about 10 to about 40 microns. One of the major advantages of this invention is that it permits the use of thinner coatings of polymeric material having low water vapor transmission rates, because of the protective properties exhibited by the lignosulfonate/mineral filler overcoat.

The lignosulfonates used as the binder component of the protective coating are commercially available salts made from the lignin of sulfate or sulfite pulp mill liquors. The most preferred lignosulfonates are the metal or ammonium salts, particularly the alkali or alkaline earth metal salts such as sodium, potassium, magnesium and calcium. These materials are water soluble and form hard, durable protective films when dried. The preferred lignosulfonate is sodium lignosulfonate.

The filler component of the protective overcoat includes carbon black, pigments such as $TiO_2$, silica, alumina, aluminosilicates and many of the clay-type mineral materials which are commercially available, including talc, calcium carbonate, diatomaceous earth, bentonite, kaolin, wollastonite, dolomite, gypsum, pyrophyllite, and phosphorite, as well as mixtures of different filler types. Preferred fillers are minerals processed to have an average particle size in the range of from about 0.1 to about 50 microns. The most preferred filler material is talc (hydrous magnesium silicate) having an average particle size less than 20 microns, preferably less than 10 microns.

The controlled release (CR) material (substrate encapsulated in the controlled release coating) may be overcoated with the protective coating by sequential application of an aqueous solution of the lignosulfonate and the finely divided mineral filler to a tumbling or moving mass of the CR material in a rotary drum, pan, ribbon or paddle mixer, or by fluidized bed techniques as described above for the application of the controlled release coating. It is preferred to utilize mixing techniques which minimize abrasive contact of the CR particles while providing uniform distribution of the applied protective coating. Preferably the lignosulfonate is applied as a 10 to 65% by weight solution in water, more preferably as a 20–50% by weight aqueous solution.

Although the filler and aqueous lignosulfonate may be applied in any order of sequence, e.g., lignosulfonate or filler first followed by the remaining component second, it is preferred to first apply the aqueous lignosulfonate for a period of time sufficient to thoroughly wet and coat the CR substrate, followed by application of the finely divided filler. This process may be repeated for 1 or more sequences, e.g. to a total of 10 sequences, to provide a protective overcoat having the desired hardness and thickness. It is preferred that the final protective overcoat contains at least about 50% by weight of the filler, more preferably from about 65 to about 95% by weight of said filler on a dry weight basis. The overcoat combination of lignosulfonate and filler should constitute from about 1 to about 20% by weight, on a dry weight basis, of the finished controlled release composition.

In a preferred embodiment, the aqueous lignosulfonate is applied at ambient temperatures, e.g. from 20°–40° C., to a moving mass of the CR particles and mixing continued for a period of 10 seconds to 2 minutes. The wetted CR particles are then dusted with finely divided mineral filler and mixing continued until the filler is distributed over the surface of the particles, usually also a time period of 10 seconds to 2 minutes. These steps may then be repeated from 1 to 10 sequences to ultimately provide a protective overcoat layer comprising the mineral filler dispersed in the lignosulfonate binder. The product is then recovered and dried.

The overcoat layer may also contain other ingredients to modify the hardness and appearance of the finished product such as dyes, colloids, gums and the like, generally at levels below 0.5 by weight. In addition, and particularly for fertilizer applications, this layer can be formulated to also contain minor amounts of fertilizer or plant nutrients to provide an immediate source of some fertilizer or plant nutrient after the controlled release fertilizer is applied to the soil.

The following examples are illustrative of the invention.

EXAMPLE 1

This example illustrates the preparation of a controlled release fertilizer comprising a urea core material encapsulated by a sodium neutralized, sulfonated terpolymer (SEPDM) containing about 50% by weight ethylene, about 45% by weight propylene and the balance non-conjugated diene such as disclosed in U.S. Pat. No. 4,988,377.

4 kg of -6 +14 mesh urea particles were introduced into a fluid bed coating machine, including a Wurster insert, manufactured by Glatt Air techniques Inc., model number GPCG-5. The urea bed was fluidized by blowing 130 scfm of heated air (45° C.) through the bed. After the bed reached a temperature of 30° C., a 2.5 weight percent solution of the SEPDM polymer in toluene and methanol consolvent was sprayed onto the granules at the Wurster insert entrance. The spray nozzle used was a commercial two fluid nozzle using air at 3 bars (300 kPa) pressure to form an atomized spray regime in the Wurster insert.

The spraying was continued at a 40 gm/min rate until the required thickness of polymeric coating was built up on the urea, i.e., approximately 40 minutes for a coating level of 1 weight percent polymer on the urea.

After the solution was sprayed onto the granules in the Wurster insert, the thus coated granules were blown by the heated air upwards into the drying section of the machine. Here, the solvents were evaporated by the hot stream, leaving a thin coat of dried polymeric material on the granules. The dried granules fell back into the fluid bed and then re-entered the Wurster insert where the coating process was repeated. Thus, multiple films or layers of the sulfonated polymeric coating were built up until the spraying was stopped. The final product had a coating weight of about 2% by weight of the SEPDM polymer, on a dry weight basis.

EXAMPLE 2

A 40% (w/w) sodium lignosulfonate solution was prepared by dissolving 6.66 kg of the brown powder in 10.0 L of hot water. To the solution prepared above was added an appropriate amount of a liquid blue dye (74 gm) to furnish a brownish green color.

Into a stainless steel mixer (ribbon and paddle type) charged with 175 kg of SEPDM-coated urea was sprayed 1.8 L of the lignosulfonate solution prepared above using a pressurized carbon dioxide atomizer, and followed by the addition of 4.2 kg of fine, platy talc (100% finer than 20 micron). The whole was mixed for 20–30 seconds at a controlled speed until the talc-lignosite coating was dry to the touch. The same process was repeated three times, giving an evenly distributed overcoat on the surface of the granules. The coated granules were then discharged through a tumbler for compaction, and then through a forced hot air drier at 25°–30° C. to furnish the protected granules with an appealing light green overcoat. This gave 10% by weight of talc-lignosulfonate overcoat on the finished product.

EXAMPLE 3

Two hundred and fifty (250) L of concentrate lignosulfonate (47% w/w) was diluted with 250 L of water and mixed with 1.75 kg of liquid blue dye. This solution was sprayed on 175 kg of the SEPDM-coated urea granules in the mixer for 26 seconds (flow rate 2.75 L/min at 415 kPa) and the mixture was then sprinkled with 7 kg of talc powder (96% less than 20 micron) over a period of 40 seconds. This process was repeated three times and finally capped with additional 26 seconds of lignosulfonate spray. The final overcoat was dry to the touch. The product was then discharged for compaction and further dried by forced air at ambient temperatures.

The effect of abrasion on the control release properties of the SEDM-coated urea particles was evaluated by subjecting particles to abrasion in a rotating drum and then evaluating the control release properties of the abraded material vs. a sample of the same batch of SEPDM-coated urea which was not subjected to abrasion, as set forth in Examples 4 and 5 below.

EXAMPLE 4

450 kg of SEPDM-coated urea such as prepared in Example 1 were introduced into a 1 ton Waconia blender which is a horizontal drum-type blender with internal baffles.

An abrading mixture of 200 kg of monoammonium phosphate (−14 mesh) and 325 kg of potash (−14 mesh) was also added to the blender to simulate a field mixing/ formulation process. These components were then tumbled in the blender for one minute, after which time the contents were discharged and screened to separate a representative sample of the SEPDM-coated urea granules from the other powder components. This recovered product was washed briefly to remove surface powder and designated batch A.

This process was repeated using a different batch of SEPDM-coated urea granules also made according to the general process of Example 1. The recovered abraded product was designated as batch B.

The cumulative release properties of batch A and batch B were evaluated and compared with batch A and batch B particles which were not subjected to the abrasion test by the following analytical procedure.

EXAMPLE 5

15 grams of the control release product (CR) from batch A were placed in a 125 ml Erlenmeyer flask after which 75 ml of distilled water was added. The contents were gently swirled until all particles were submersed. The flask was then stoppered and let stand at room temperature, approximately 23° C.

After 4 days standing time, the flask was swirled to remix the contents and the water solution was carefully decanted into a 100 ml volumetric flask, leaving the particles behind.

The residual particles were then washed with 15 ml of distilled water and the wash water was also decanted into the volumetric flask. Additional distilled water was added to the volumetric flask to bring the contents to 100 ml.

A 15 ml aliquot was removed from the volumetric flask and placed in a previously weighed aluminum dish and the initial weight recorded. The contents of the disk were then evaporated to dryness in a 90° C. oven for 3 hours, after which the final weight of the dish was recorded.

The weight of urea present in the dish was then compared with the weight of the CR sample (less the weight of the SEPDM coating) and the % release of urea was calculated.

The process was repeated by reswirling the residual sample of CR particles once again in 75 ml of distilled water and permitting this sample to stand for an additional 3 days (7 days cumulative total), after which additional urea release was measured as above.

The process was repeated three more times after seven days standing time each and urea release was measured after each seven day period. The cumulative release of urea over the 4, 7, 14, 21 and 28 day time periods was then recorded.

This process was repeated as set forth above using the CR product from batch B as the test material, and also using batch A and B CR material which had been subjected to abrasion in accordance with Example 4.

The % cumulative release of urea from each of the abraded and unabraded test samples after these time periods is recorded in Table 1, as is the average % cumulative release of the A and B samples.

TABLE 1

| | % CUMULATIVE RELEASE | | | | |
|---|---|---|---|---|---|
| | DAYS | | | | |
| SAMPLE | 4 | 7 | 14 | 21 | 28 |
| Unabraded CR-A | 3 | 4 | 8 | 12 | 18 |
| Unabraded CR-B | 5 | 7 | 9 | 12 | 16 |
| Ave % Release | 4 | 5.5 | 8.5 | 12 | 17 |
| Abraded CR-A | 9 | 17 | 34 | 49 | 61 |
| Abraded CR-B | 9 | 12 | 25 | 38 | 52 |
| Ave % Release | 9 | 14.5 | 29.5 | 43.5 | 56.5 |

A comparison of the release properties for the unabraded and abraded products indicates that the abraded material released urea at about 3 times the rate of the unabraded material. This is indicative of damage to the polymer film encapsulating the urea as a consequence of abrasion and tumbling encountered in the mixing operation.

EXAMPLE 6

Two separate batches (batches C and D) of SEPDM-coated urea fertilizer which had been further overcoated with the lignosulfonate/talc mixture as described in Example 2 were split and a portion of each batch was subjected to abrasion as follows. An abrading mixture of 2010 lb of the overcoated SEPDM-coated urea, 1770 lb. of mono ammonium phosphate, 1839 lb. of potassium sulfate and 2057 lb. of dolomite filler was introduced into a commercial 6 ton horizontal Waconia blender equipped with an auger infeed/discharge system. The batch was blended for 30 seconds after all components were in the blender. The total cycle time including infeed and blending discharge was about 5 minutes. The product was screened to separate the coated granules from the abrasive products and washed. The cumulative control release properties of each product were evaluated by the procedure of Example 5 and the cumulative release properties of the unabraded CR overcoated product (CRO) were compared with the abraded CRO. The urea release profiles of the unabraded samples differ from the profile of Table 1 because of a thinner SEPDM coating. Results are shown in Table 2.

TABLE 2

| | % CUMULATIVE RELEASE | | | | |
|---|---|---|---|---|---|
| | DAYS | | | | |
| SAMPLE | 4 | 7 | 14 | 21 | 28 |
| Unabraded CRO-C | 6 | 11 | 24 | 34 | 42 |
| Unabraded CRO-D | 4 | 7 | 18 | 28 | 36 |
| Ave % Release | 5 | 9 | 21 | 31 | 39 |
| Abraded CRO-C | 6 | 11 | 23 | 34 | 42 |
| Abraded CRO-D | 5 | 9 | 22 | 32 | 40 |
| Ave % Release | 5.5 | 10 | 22.5 | 33 | 41 |

A comparison of the release properties of the unabraded CRO and abraded CRO products shows that the abraded material exhibited only a very slight increase in the rate of urea release indicating that the overcoating had provided a protective barrier against significant damage to the underlying SEPDM coating.

What is claimed is:

1. A method for preparing a controlled release chemical composition having improved release properties comprising:

(a) providing particles of a water soluble chemical compound encapsulated in a controlled release coating layer which is slowly permeable to water;

(b) mixing said particles with an aqueous solution containing a metal or ammonium lignosulfonate to uniformly coat said particles with said solution;

(c) contacting said coated particles under mixing conditions with a finely divided mineral filler such that said filler uniformly adheres to the surface of said coated particles; and (d) drying said coated particles.

2. The method of claim 1 wherein steps (b) and (c) are repeated in sequence for from 1 to about 10 sequences.

3. The method of claim 1 wherein said particles are first coated with said finely divided filler prior to step (b).

4. The method of claim 1 wherein said filler is talc.

5. The method of claim 4 wherein said aqueous solution contains sodium lignosulfonate.

* * * * *